UNITED STATES PATENT OFFICE

KARL MARX, HERMANN BEHNCKE, AND KARL BRODERSEN, OF DESSAU, GERMANY, ASSIGNORS TO I. G. FARBENINDUSTRIE AKTIENGESELLSCHAFT, OF FRANKFORT-ON-THE-MAIN, GERMANY

CATALYSTS

No Drawing. Application filed June 25, 1927, Serial No. 201,557, and in Germany November 27, 1926.

The present invention relates to new catalysts and to a process of preparing the same; more particularly it relates to catalysts comprising a metal of the group including nickel, cobalt, and copper, and an oxide of a metal which is more electropositive than the metals of the aforementioned group.

The catalytic reduction or hydrogenation of organic compounds with aid of hydrogen is generally performed in presence of metallic catalysts, among which nickel, cobalt and copper have the premier place. Accordingly as the catalysis occurs in the gaseous phase or the liquid phase, the metal, its oxide or a salt of it is used. When operating in the liquid phase with the free metal as catalyst, the metal is generally used in the form in which it is obtained by reducing its oxide or other compound capable of reduction by means of hydrogen. Obviously in such case the reduction of the oxide occurs at a high temperature.

For many catalytic purposes metallic catalysts thus made are not sufficiently active, particularly at low temperatures which are necessary in many cases in which decomposition or secondary reaction would otherwise occur.

We have now found that extraordinarily active catalysts are obtainable when the metal in question is separated directly from the aqueous solution of its salt in the presence of a basic reacting compound such as ammonia, an organic base, an acid amide, etc., by means of a more electro-positive metal. This separation occurs at a low temperature, which obviously is below the boiling point of the solution used. For example, nickel, cobalt or copper may easily be separated from such solutions by means of iron, zinc or aluminium, a very finely subdivided metal being obtained according to the conditions. It is advantageous to bring about this separation in presence of a carrier, such as kieselguhr, silica gel, carbon or the like, whereby increase of surface is obtained. When operating in the manner described before there is obtained as by-product the oxide of the electro-positive metal used for the separation and in the choice of this there is a means of activating the catalyst.

The catalysts obtainable in this manner are extraordinarily active. They can be used with particular advantage for catalytic reduction or hydrogenation of organic compounds, when carried out in the liquid phase and at comparatively low temperatures. For example, aromatic hydrocarbons or their derivatives, such as toluene or phenol, may be converted into the corresponding hexahydro-compounds even at a temperature of about 90-100° C; aliphatic compounds containing doubly linked carbon, as for instance cinnamic acid or certain fats, can be converted into the saturated compounds at a temperature of about 50-80° C; aldehydes or ketones may be converted into the corresponding alcohols at a temperature of about 40-60° C.; quinones can be converted into hydroquinones and nitriles into the corresponding amines at similar temperatures. So also nitro-, azoxy-, azo- or hydrazo-compounds can be converted into the corresponding amines. In short, the catalysts have an extraordinarily varied application.

The following examples illustrate the invention, the parts being by weight:—

*Example 1.*—238 parts of crystallized nickel chloride are dissolved in 1000 parts of water and mixed with 50 parts of ammonium chloride and 700 parts of concentrated ammonia solution. To the solution thus obtained are added, while stirring, 300 parts of kieselguhr and there are then introduced gradually at 80-90° C. 100 parts of aluminium powder. When separation of nickel is finished the whole is stirred for some time; the catalyst consisting of metallic nickel, kieselguhr and aluminium oxide is separated from the liquid in the usual manner and thoroughly washed.

*Example 2.*—238 parts of nickelous chloride or a corresponding quantity of another nickel salt are dissolved in 1000 parts of water and the solution is mixed with 320 parts of pyridine. While stirring at 60-70° C. there are gradually added 180 parts of zinc dust and the mixture is gradually heated to 90-95° C. When the separation of nickel is at an end the precipitate is filtered and heated with 2N sodium carbonate solution for one hour at 90–100° C. The catalyst is then separated from the liquid and thoroughly washed.

*Example 3.*—280 parts of cobalt sulphate ($CoSO_4 + 7H_2O$) are dissolved in 1000 parts of water and the solution is mixed with 240 parts of urea. There are then added at 60–70° C. 110–120 parts of zinc dust, whereupon the whole is stirred until separation of cobalt is at an end, the temperature being kept at 90–95° C. The precipitate is filtered and washed until free from sulphate ions.

*Example 4.*—170 parts of crystallized cuprous chloride are dissolved in 1000 parts of water, and the solution is mixed with 700 parts by volume of concentrated ammonia solution. There are then added, while stirring, 300 parts of kieselguhr and then at a temperature of about 70–80° C. 100 parts of aluminium powder. When the separation of copper is finished, the stirring is continued for some time before the reaction product consisting of metallic copper, aluminium oxide and kieselguhr is separated from the reaction liquid and washed thoroughly.

What we claim is:—

1. A catalyst comprising a metal of the group consisting of nickel, cobalt and copper and an oxide of a metal which is more electropositive than the metals of the aforementioned group, said catalyst being in a finely subdivided state, forming amorphous flakes of gray to grayish-black color and being capable of causing aromatic hydrocarbons to be converted into the corresponding hydro compounds when treated with hydrogen at a temperature of about 100° C. and being obtainable by causing an aqueous solution of a salt of one of the said metals to be reacted upon by a metal which is more electropositive than the metals of the aforementioned group in the presence of a compound of the group consisting of the organic bases, the acid amides, and ammonia.

2. A catalyst comprising a metal of the group consisting of nickel, cobalt, and copper, an oxide of a metal which is more electropositive than the metals of the aforementioned group, and a carrier, said catalyst being in a finely subdivided state, forming amorphous flakes of gray to grayish-black color and being capable of causing aromatic hydrocarbons to be converted into the corresponding hydro compounds when treated with hydrogen at a temperature of about 100° C. and being obtainable by causing an aqueous solution of a salt of one of the said metals to be reacted upon by a metal which is more electropositive than the metals of the aforementioned group in the presence of a carrier and a compound of the group consisting of the organic bases, the acid amides, and ammonia.

3. A catalyst comprising a metal of the group consisting of nickel, cobalt and copper and aluminium oxide, said catalyst being in a finely subdivided state, forming amorphous flakes of gray to grayish-black color and being capable of causing aromatic hydrocarbons to be converted into the corresponding hydro compounds when treated with hydrogen at a temperature of about 100° C. and being obtainable by causing an aqueous solution of a salt of one of the said metals to be reacted upon by aluminium powder in the presence of a compound of the group consisting of the organic bases, the acid amides, and ammonia.

4. A catalyst comprising a metal of the group consisting of nickel, cobalt and copper, aluminium oxide, and a carrier, said catalyst being in a finely subdivided state, forming amorphous flakes of gray to grayish-black color and being capable of causing aromatic hydrocarbons to be converted into the corresponding hydro compounds when treated with hydrogen at a temperature of about 100° C. and being obtainable by causing an aqueous solution of a salt of one of the said metals to be reacted upon by aluminium powder in the presence of a carrier and a compound of the group consisting of the organic bases, the acid amides, and ammonia.

5. A catalyst comprising nickel and aluminium oxide, said catalyst being in a finely subdivided state, forming amorphous flakes of gray to grayish-block color and being capable of causing aromatic hydrocarbons to be converted into the corresponding hydro compounds when treated with hydrogen at a temperature of about 100° C. and being obtainable by causing an aqueous solution of a nickel salt to be reacted upon by aluminium powder in the presence of a compound of the group consisting of the organic bases, the acid amides, and ammonia.

6. A catalyst comprising nickel, aluminium oxide and a carrier, said catalyst being in a finely subdivided state, forming amorphous flakes of gray to grayish-black color and being capable of causing aromatic hydrocarbons to be converted into the corresponding hydro compounds when treated with hydrogen at a temperature of about 100° C. and being obtainable by causing an aqueous solution of a nickel salt to be reacted upon by aluminium powder in the presence of a carrier and a compound of the group consisting of the organic bases, the acid amides, and ammonia.

7. The process which comprises causing an aqueous solution of a salt of a metal of the group consisting of nickel, cobalt and copper to be reacted upon by a metal which is more electro-positive than the metals of the aforementioned group, in the presence of a compound of the group consisting of the organic bases, the acid amides and ammonia.

8. The process which comprises causing an aqueous solution of a salt of a metal of the group consisting of nickel, cobalt and copper to be reacted upon by aluminium powder, in the presence of a compound of the group consisting of the organic bases, the acid amides and ammonia.

9. The process which comprises causing an aqueous solution of a nickel salt to be reacted upon by a metal which is more electro-positive than nickel, in the presence of a compound of the group consisting of the organic bases, the acid amides and ammonia.

10. The process which comprises causing an aqueous solution of a nickel salt to be reacted upon by aluminium powder in the presence of a compound of the group consisting of the organic bases, the acid amides and ammonia.

In testimony whereof, we affix our signatures.

KARL MARX.
HERMANN BEHNCKE.
KARL BRODERSEN.